United States Patent
Ashbrook (10) Patent No.: US 11,365,966 B2
(45) Date of Patent: Jun. 21, 2022

(54) VEHICLE LOCALISATION USING THE GROUND SURFACE WITH AN EVENT CAMERA

(71) Applicant: MACHINES WITH VISION LIMITED, Edinburgh (GB)

(72) Inventor: Anthony Ashbrook, Edinburgh (GB)

(73) Assignee: MACHINES WITH VISION LIMITED, Edinburgh (GB)

( * ) Notice: Subject to any disclaimer, the term of this patent is extended or adjusted under 35 U.S.C. 154(b) by 391 days.

(21) Appl. No.: 16/319,344

(22) PCT Filed: Jul. 19, 2017

(86) PCT No.: PCT/GB2017/052131
§ 371 (c)(1),
(2) Date: Jan. 20, 2019

(87) PCT Pub. No.: WO2018/015754
PCT Pub. Date: Jan. 25, 2018

(65) Prior Publication Data
US 2019/0265038 A1  Aug. 29, 2019

(30) Foreign Application Priority Data
Jul. 19, 2016 (GB) ..................... 1612528

(51) Int. Cl.
*G01B 11/25* (2006.01)
*G01C 21/04* (2006.01)
(Continued)

(52) U.S. Cl.
CPC .......... *G01B 11/2522* (2013.01); *G01B 11/25* (2013.01); *G01C 21/04* (2013.01);
(Continued)

(58) Field of Classification Search
CPC ....... G01B 11/2522; G01B 11/25; G06T 7/74; G06T 2207/10016; G06T 2207/10028;
(Continued)

(56) References Cited

U.S. PATENT DOCUMENTS 5,652,655 A * 7/1997 Uno ........................ B60T 8/172
356/600
5,930,383 A  7/1999 Netzer
(Continued)

FOREIGN PATENT DOCUMENTS

CN  101566471 A  10/2009
CN  202885828 U  4/2013
(Continued)

OTHER PUBLICATIONS https://en.wikipedia.org/w/index.php?title=Event_camera&dir=prev&action=history (Year: 2019).*
(Continued)

*Primary Examiner* — Nicholas Kiswanto
(74) *Attorney, Agent, or Firm* — Brooks Kushman P.C.

(57) ABSTRACT

A method for estimating vehicle location by obtaining change events from an event camera's observations of a ground surface moving relative to the vehicle, determining a signature of the ground surface from the change events; and estimating the location using the signature. The change events may be processed to produce an 1st invariant representation of a ground surface patch for use as the signature. Alternatively, range measurements representing a patch may be used as the signature. A map is constructed having the representations of the ground surface patches including the locations of the patches. The same patch of ground surface is subsequently measured thereby obtaining a sequence of change events which are processed to produce a 2nd representation. The 2nd representation is matched to the map of
(Continued)

1st invariant representations. The location of the vehicle on the ground is determined based on the match.

18 Claims, 5 Drawing Sheets (51) Int. Cl.
*G01S 19/48* (2010.01)
*G01S 17/89* (2020.01)
*G06T 7/73* (2017.01)

(52) U.S. Cl.
CPC .............. *G01S 17/89* (2013.01); *G01S 19/48* (2013.01); *G06T 7/74* (2017.01); *G06T 2207/10016* (2013.01); *G06T 2207/10028* (2013.01); *G06T 2207/30244* (2013.01); *G06T 2207/30252* (2013.01)

(58) Field of Classification Search
CPC .......... G06T 2207/30244; G06T 2207/30252; G01C 21/04; G01S 17/89; G01S 19/48
See application file for complete search history.

(56) References Cited

U.S. PATENT DOCUMENTS

| | | | |
|---|---|---|---|
| 5,999,866 A | 12/1999 | Kelly | |
| 6,542,249 B1 | 4/2003 | Kofman | |
| 6,754,370 B1 | 6/2004 | Hall-Holt | |
| 7,082,209 B2* | 7/2006 | Ito | G06T 7/254 382/103 |
| 7,872,764 B2* | 1/2011 | Higgins-Luthman | B60G 17/0165 356/602 |
| 8,099,213 B2* | 1/2012 | Zhang | G01S 7/4802 701/41 |
| 9,852,357 B2* | 12/2017 | Zhang | G06K 9/00798 |
| 10,235,770 B2* | 3/2019 | Hoye | B60R 1/10 |
| 2003/0052169 A1 | 3/2003 | Tsikos | |
| 2005/0002558 A1 | 1/2005 | Franke | |
| 2005/0028611 A1 | 2/2005 | Tanaka | |
| 2008/0033645 A1 | 2/2008 | Levinson | |
| 2010/0303341 A1 | 12/2010 | Hausler | |
| 2013/0038694 A1 | 2/2013 | Nichani | |
| 2013/0079990 A1* | 3/2013 | Fritsch | G06T 7/11 701/41 |
| 2013/0085642 A1* | 4/2013 | Dankers | G06K 9/605 701/48 |
| 2013/0258108 A1* | 10/2013 | Ono | H04N 7/18 348/148 |
| 2014/0005932 A1 | 1/2014 | Kozak | |
| 2014/0121964 A1 | 5/2014 | Stanley | |
| 2016/0096477 A1 | 4/2016 | Biemer | |
| 2017/0003121 A1 | 1/2017 | Brandli | |
| 2017/0161571 A1 | 6/2017 | Zhao | |
| 2018/0321142 A1* | 11/2018 | Seifert | B60W 50/14 |

FOREIGN PATENT DOCUMENTS

| | | |
|---|---|---|
| DE | 102015208442 A1 | 11/2016 |
| EP | 2887009 A1 | 6/2015 |
| EP | 2905156 A1 | 8/2015 |
| FR | 2890477 A1 | 3/2007 |
| KR | 20150012384 A | 2/2015 |
| RU | 2526793 C1 | 8/2014 |
| WO | 2015184308 A1 | 3/2015 |
| WO | 2015185048 A1 | 12/2015 |

OTHER PUBLICATIONS

Brandli et al, "Adaptive pulsed laser line extraction for terrain reconstruction using a dynamic vision sensor", Front. Neurosci., Jan. 17, 2014.
Baldwin et al, "Laser-only road-vehicle localization with dual 2D push-broom LIDARS and 3D priors", Conf. on Intelligent Robots and Systems (IROS), Vilamoura, Algarve, Portugal, 2012.
Nagatani et al, "Improvement of Odometry for Omnidirectional Vehicle using Optical Flow Information", Proceedings. 2000 IEEE/RSJ International Conference on Intelligent Robots and Systems (IROS 2000); Oct. 31-Nov. 5, 2000; Takamatsu, Japan, IEEE, Piscataway, NJ, USA, vol. 1, Oct. 31, 2000 (Oct. 31, 2000), p. 468.
International Search Report for PCT/GB2017/052131, completed by the European Patent Office dated Sep. 13, 2017. All together 3 pages.

* cited by examiner

VEHICLE LOCALISATION USING THE GROUND SURFACE WITH AN EVENT CAMERA

CROSS-REFERENCE TO RELATED APPLICATION

This application is the U.S. national phase of PCT Application No. PCT/GB2017/052131 filed on Jul. 19, 2017, which claims priority to GB Patent Application No. 1612528.8 filed on Jul. 19, 2016, the disclosures of which are incorporated in their entirety by reference herein.

The present invention relates to methods and systems for estimating the location of a vehicle.

BACKGROUND ART

Highly autonomous vehicles need to determine their location relative to the road. Global navigation satellite systems such as GPS (Global Positioning System) and GLONASS (Global Navigation Satellite System), which have resolutions of the order of meters, are not accurate enough. Various enhancement schemes exist, such as RTK (Real Time Kinematic) and Differential GPS but these require additional ground-based infrastructure.

Sometimes there is also a need for accurate location for non-autonomous vehicles. For example in the rail industry measurement trains are used to inspect the geometry of the tracks and to detect faults in order to ensure safe and reliable operation. These trains need to report the location of these problems with high accuracy Even as global navigation satellite systems improve autonomous and non-autonomous vehicles may often encounter situations where satellite technology will not work (e.g. in tunnels).

By providing a vehicle with more accurate information of its location, it can determine its situation on the road, or track surface, more precisely. As defined by the SAE (Society of Automotive Engineers) standard J3016, vehicle localisation is of critical importance for autonomy as it naturally informs any decision relating to navigation and immediate vehicle position—ultimately leading to better decisions and improved safety.

However, a problem is in the accuracy of this location (especially at speed and in variable environmental lighting/conditions). For certain automated tasks, or when precision in reporting position is required, it would be useful to know the position of the vehicle to within a few cm or mm. This cannot be derived via standard GPS, and often not at all in urban environments without a clear line-of-sight to satellites overhead.

Consequently, existing approaches to the problem have favoured a fusion of GPS, odometry and other sensors that build a complete 3D (3-Dimensional) model of the adjacent road-side environment.

State-of-the-art autonomous vehicles, and other non-autonomous vehicle systems, determine vehicle location by matching large-scale 3D structure captured by on-vehicle sensors to large-scale 3D structure captured in advance by a survey vehicle (the "prior map"). In some cases each vehicle also acts as a survey vehicle and the "prior map" is constantly updated. Large-scale structure is typically buildings and other large fixed objects that can be sensed using on-vehicle sensors on a moving vehicle. The on-vehicle sensors for localisation may comprise LiDAR (Light Detection And Ranging) (such as in the case of the Google Self-Driving Car), monocular camera systems, or 3D cameras (such as in the case of the Oxford Robotcar).

These on-vehicle sensors, such as LiDAR and stereo photogrammetry, are expensive, bulky, complex in themselves, power hungry, and complex to interpret. LiDAR in particular can be susceptible to hacking (there have been reports of LiDAR incorrectly seeing objects if people shine laser pointers at the sensor) or can be influenced by external factors (there is some concern that LiDAR units on close vehicles can interfere with each other).

EP2887009A1 (Universitat ZOrich, ETH ZOrich) discloses a method for reconstructing a surface (3D scanning) using spatially structured light and a dynamic vision sensor. This 3D scanner setup is used on a mobile robot for the purpose of navigation by allowing the robot to detect and avoid obstacles.

EP2887009A1 concerns measuring the terrain surface. This in itself is not sufficient to determine location.

EP2887009A1 uses a pulsed laser plane and an event camera to measure the terrain. It exploits the property that event cameras respond to change by introducing a light source with temporarily varying intensity. The system is specifically designed to measure the visual change due to this varying intensity light source and to use this to determine the geometry of terrain. The camera detects events along the line where the laser plane intersects the surface of the terrain. The rate at which the laser is pulsed limits the spatial resolution at which the terrain can be measured at a given speed. They report working up to 500 Hz. They suggest that higher frequency might be possible with a stronger laser although this would have practical implications on power requirement and (eye) safety. Even at a relatively slow vehicle speed of 30 mph (approximately 13 meters per second) the surface will have moved 260 mm between pulses of the laser if data is captured at 500 Hz. The features of a road surface are of the order of 0.1 mm to 10 mm and would be completely lost.

The system of EP2887009A1 averages data measured from several pulses of the laser. This implies that the terrain is (approximately) stationary during the scanning process and could not be used to determine terrain (and subsequently location by matching terrain) on a vehicle moving at speed.

The system of EP2887009A1 builds up a surface model by aggregating multiple 'lines' of data where each line of data is determined from multiple pulses of the laser at the same location on the surface. To 'scan' the surface the surface was put on a sled which is moved at a controlled speed (of 1.94 cm/s). To determine location of a vehicle based on measuring and matching terrain it is not possible to control the movement using a sled. EP2887009A1 discusses the problem of practical applications where a sled cannot be used and suggests some solutions but does not go into detail or test these ideas.

Furthermore, EP2887009A1 does not disclose how 3D data can be captured and processed to extract features or how such features are used for matching.

In general, there are problems arising from approaches that rely on having full 3D data of the environment to match against (and so localise). Not only is this matching a difficult problem, but the acquisition of the data in the first place is a huge task, as is its subsequent storage and update in response to dynamic elements that change. A further challenge is that reliable and efficient matching requires removal of non-fixed elements such as people and other vehicles from the stored 3D environment data. A factor that often rules out this approach for many rural situations is the lack of fixed large-scale 3D structure in rural settings.

US20140005932 (Southwest Research Institute) discloses a system and method for estimating location and motion of an object. An image of a road surface is obtained and a first set of features is extracted from the image. A map database is searched for a second set of features that match the first set of features and a geo-location is retrieved from the map database, wherein the geo-location is associated with the second set of features. The location is estimated based on the retrieved geo-location. The motion of the object, such as distance travelled, path travelled and/or speed may be estimated in a similar manner by comparing the location of extracted features that are present in two or more images over a selected time period.

In the system of US20140005932 the problem of blurring caused by movement of the vehicle is addressed by illuminating the road surface with a strobe light. This essentially freezes the fast motion of the surface and allows an image to be captured; without the strobe lighting the image would be completely blurred by the fast motion. However, this requires high power usage, fragile components and fast cameras. The approach works at relatively low speed, using high power, and with high computing power.

US20140005932 does not disclose 3D data being captured and processed to extract features and how such features are used for matching.

SUMMARY OF INVENTION

It is desirable to determine the position of a vehicle relative to the ground surface or road for the purpose, for example, of autonomous navigation whilst significantly reducing the cost, size, power requirements and complexity and whilst improving localisation precision and accuracy, for example from cm's to mm's, particularly at speed.

According to a first aspect of the present invention, there is provided a method for estimating a location of a vehicle comprising:
 (a) obtaining change events from an event camera's observations of a ground surface moving relative to the vehicle, the change events arising from the ground surface moving relative to the vehicle;
 (b) determining a signature of the ground surface from the obtained change events; and
 (c) estimating the location using the signature.

Preferably, the signature of the ground surface characterises ground surface texture having a wavelength of 50 mm or less.

Preferably, the change events comprise a sequence.

Preferably, the method further comprises the step of using motion data corresponding to the event camera's observations to produce a spatially-organised collection of the change events for the use as the signature.

Preferably, the method further comprises the step of using timing data corresponding to the event camera's observations to produce a time-organised collection of the change events for the use as the signature.

Preferably, the method further comprises illuminating the ground surface with electromagnetic radiation in the event camera's field of view.

Preferably, the electromagnetic radiation is structured.

Preferably, the method further comprises the step of determining range measurements representing the ground surface based on the event camera's observations of the ground surface illuminated by the structured electromagnetic radiation.

Preferably, the method further comprises the step of aggregating the determined range measurements to produce a collection of range measurements representing a patch of the ground surface for the use as the signature.

Preferably, the method further comprises the step of using motion data corresponding to the event camera's observations to combine the determined range measurements into a spatially-organised collection of range measurements representing a patch of the ground surface for the use as the signature.

Alternatively, the method further comprises the step of using timing data corresponding to the event camera's observations to combine the determined range measurements into a time-organised collection of range measurements representing a patch of the ground surface for the use as the signature.

As an alternative to determining range measurements, the method may further comprise the step of processing the change events to produce an invariant representation for the use as the signature.

Preferably, the invariant representation has been automatically determined using a machine learning technique.

Alternatively, the step of processing the change events comprises integrating the change events into a representation that has invariant properties.

Alternatively, the step of processing the change events comprises using a spatio-temporal filter to produce a response when a sequence of change events with defined space and time properties are obtained, so as to produce the invariant representation.

Alternatively, the invariant representation comprises an orthographic map of change events.

Preferably, the step of processing the change events comprises mapping the obtained change events from local event camera coordinates into orthographic map coordinates, so as to produce the orthographic map.

Preferably, the mapping of the obtained change events comprises determining estimates of motion of the event camera.

Preferably, the estimates are determined using optical flow.

Preferably, the method further comprises the step of positioning the event camera under the vehicle.

Preferably, a height of operation of the event camera is determined relative to the scale of features present in the ground surface and the optical system used to resolve it.

Preferably, the optical system of the event camera is optimized to minimise the effects of radial distortion and other aberrations by calibration.

Preferably, the optical system of the event camera is kept clean by choice of housing material and mechanical means.

Preferably, the method comprises the steps of repeating the observations of the ground surface and estimating the location by searching signatures from previous observations that have associated location information.

According to a second aspect of the present invention, there is provided a system for estimating a location of a vehicle comprising:
 an event camera; and
 a processor configured to:
  (a) obtain change events from the event camera's observations of a ground surface moving relative to the vehicle, the change events arising from the ground surface moving relative to the vehicle;
  (b) determine a signature of the ground surface from the obtained change events; and
  (c) estimate the location using the signature.

Preferably, the signature of the ground surface characterises ground surface texture having a wavelength of 50 mm or less.

Preferably, the change events comprise a sequence.

Preferably, the processor is further configured to use motion data corresponding to the event camera's observations to produce a spatially-organised collection of the change events.

Preferably, the processor is further configured to use timing data corresponding to the event camera's observations to produce a time-organised collection of the change events.

Preferably, the system further comprises an illumination source for illuminating the ground surface with electromagnetic radiation in the event camera's field of view.

Preferably, the electromagnetic radiation is structured.

Preferably, the processor is further configured to determine range measurements representing the ground surface based on the event camera's observations of the ground surface illuminated by the structured electromagnetic radiation.

Preferably, the processor is further configured to aggregate the determined range measurements to produce a collection of range measurements representing a patch of the ground surface.

Preferably, the processor is further configured to use motion data corresponding to the event camera's observations to combine the determined range measurements into a spatially-organised collection of range measurements representing a patch of the ground surface.

Alternatively, the processor is further configured to use timing data corresponding to the event camera's observations to combine the determined range measurements into a time-organised collection of range measurements representing a patch of the ground surface.

Preferably, the processor is further configured to process the change events to produce an invariant representation.

Preferably, the invariant representation has been automatically determined using a machine learning technique.

Alternatively, the processor is configured to process the change events by integrating the change events into a representation that has invariant properties.

Alternatively, the processor is configured to process the change events using a spatio-temporal filter to produce a response when a sequence of change events with defined space and time properties are obtained, so as to produce the invariant representation.

Alternatively, the invariant representation comprises an orthographic map of change events.

Preferably, the processor is configured to process the change events by mapping the obtained change events from local event camera coordinates into orthographic map coordinates, so as to produce the orthographic map.

Preferably, the processor is configured to map the obtained change events by determining estimates of motion of the event camera.

Preferably, the processor is configured to determine the estimates using optical flow.

Preferably, the event camera is positioned under the vehicle.

Preferably, the processor is configured, upon obtaining the change events from the observations of the ground surface, to estimate the location by searching signatures from previous observations that have associated location information.

According to a third aspect of the present invention, there is provided a computer program product comprising one or more sequences of machine-readable instructions for estimating a location of a vehicle, the instructions being adapted to cause one or more processors to perform a method according to the first aspect.

Preferably, the ground surface according to the first, second or third aspects is a road surface.

Preferably, the ground surface according to the first, second or third aspects is a railway track bed surface.

BRIEF DESCRIPTION OF DRAWINGS

Embodiments of the present invention will now be described, by way of example only, with reference to the drawings, in which.

DESCRIPTION OF EMBODIMENTS

The inventors have devised a way to determine vehicle location that is not only lower-cost (when manufactured at scale), more compact, more discreet and more efficient than conventional approaches. It also determines position to mm accuracy and can work at practical vehicle speeds. Other advantages are robustness to environmental factors, simpler acquisition of mapping data and less mapping being required, and lower power and processing requirements.

In embodiments described below, an example ground surface is a road surface. A road surface is a particularly important ground surface in the context of autonomous vehicles because road surfaces generally form a network allowing the autonomous vehicles to travel over large geographical areas.

In an embodiment, a patch of road surface moving below the vehicle is observed to obtain a signature to determine uniquely the vehicle's location. A laser scanner, having a laser structured light source, may be used that can capture range measurements from the road surface in a way that can operate at vehicle speeds. This uses a special type of camera known as an 'event camera' or 'dynamic vision sensor' that can react much faster than conventional cameras. Conventional cameras are synchronous and run at a specific framerate whilst event cameras are generally asynchronous with each pixel reacting independently as soon as an intensity change is observed.

A ground surface patch can be characterised by its structure and its appearance. Ground surface texture, such as road surface texture, comprises its structure and/or appearance.

The structure of ground surface patches can be characterized by a number of properties such as their wavelength and mean depth. In the case of roads, these properties are intentional by-products of road construction and relate directly to desirable effects such as improved road traction, noise reduction and water dispersal; as well as less desirable effects such as increased rolling resistance and tyre wear. Macrotexture is defined as having a wavelength of 0.5 mm to 50 mm and is formed by the structure of graded aggregates particles protruding from an asphalt binding matrix. The individual size, shape, pose and dispersal of these particles—along with the manner in which they are combined and compacted into a road surface—creates a unique arrangement of surface features.

Ground surface patches can also be characterised by their appearance. The appearance is both a property of the materials used (colour) and the interaction of the structure of the ground surface with light (shadows and shading). The appearance of the graded aggregates and asphalt binding matrix may also have variation with a wavelength of 0.5 mm to 50 mm, commensurate with the structure.

In an embodiment, a sensor configuration using an event camera and a plane of laser light is used that can capture range measurements very much more rapidly than conventional LiDAR and therefore allows vehicle location estimation using fine-scale structure and in particular the fine structure of the ground surface along which the vehicle is travelling.

Electromagnetic radiation will be referred to as light herein. The light may be visible or not visible.

In the embodiment described with reference to FIGS. 1 and 2 below, as opposed to FIGS. 3 and 4, the light source is "structured", having shape, for example a thin plane of light. In this case the event camera observes events at the intersection of the light plane and the surface. If the geometry of the plane is known relative to the event camera (this can be determined by design or calibration of the equipment) then a range measurement for each event can be determined explicitly. These range measurements provide information for searching by matching or indexing.

Calibration methods for laser scanner systems are well known and typically involve capturing one or more images of a 2D or 3D calibration target intersecting the plane of laser light. Various calibration models exist, such as: (1) direct calibration where the range at each camera pixel is stored as a look-up-table; (2) a planar projection model where the range at each camera pixel is represented as a planar projection from the camera image plane to the laser plane; and (3) a camera-plane model comprising a camera model that defines a ray for each pixel and a plane model representing the position of the plane relative to the camera such that the range at each pixel is determined by the intersection of the ray and the plane.

With reference to FIG. 1, a system for estimating a location of a vehicle using a structured light source is illustrated. The system for precisely locating a vehicle is based on capturing and matching the fine structure of the ground surface, split between acquisition as shown in FIG. 1(b) and localisation as shown in FIG. 1(d).

Figure 1A:
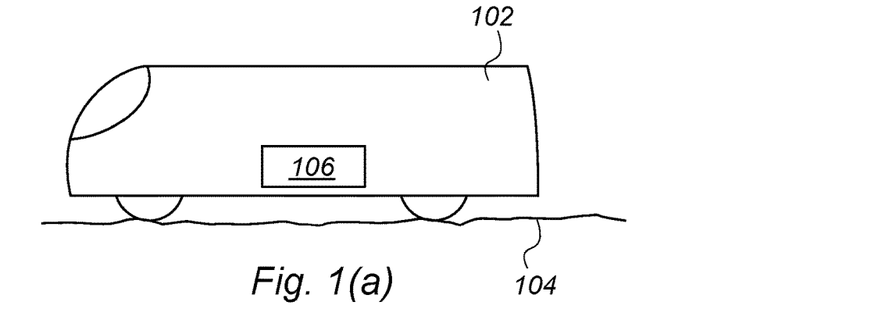
FIG. 1 illustrates, in schematic form, a system for estimating the location of a vehicle using a structured light source in accordance with an embodiment of the present invention.

FIG. 1(a) illustrates the vehicle, which in this example is a car or train 102.

The vehicle is travelling across a ground surface 104 such as a road or track bed (the rails are not shown). The vehicle has an acquisition unit 106, the operation of which is illustrated by FIG. 1(b).

Figure 1B:
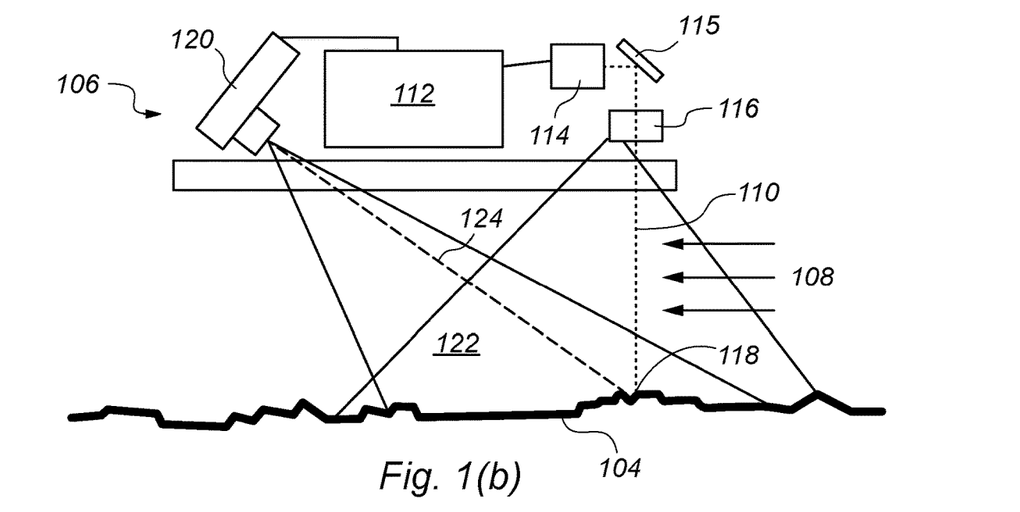
Figure 1C:
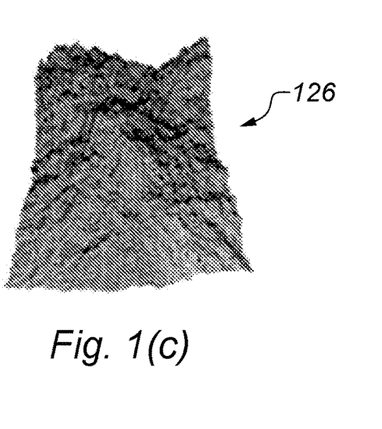

As illustrated by FIG. 1(b), motion along the surface of the ground 104 at speed 108 is illuminated by a laser plane 110. A processor 112 activates a laser source 114. In this and the other embodiments, the processor may be a single central processing unit or distributed across more than one processing unit. Alternatively, the laser could just be 'on' and not necessarily controlled by a processor. The output laser beam is (optionally) reflected by a mirror 115 and passes through a cylindrical lens 116 creating a laser plane which creates a stripe 118 on the ground surface where the laser plane 110 is scattered by the ground surface 104. Change events are generated instantaneously by an event camera 120 in the acquisition unit 106, which has a field of view 122, as observations of the laser stripe 118 pass across event camera pixels due to the relative motion of the ground surface. The change events are processed by the processor 112 to estimate the observed position of the laser stripe in the event camera, for example by identifying a series of + polarity and then − polarity events consistent with the observed laser stripe passing across an event camera pixel. The observed laser stripe crossing event camera pixels defines range measurements (using calibration data describing the geometry of the camera and laser plane) and the range measurements are integrated by the processor 112 with motion information, such as provided by an accelerometer, to produce a range model of the ground 126, as shown in FIG. 1(c). Thus an accelerometer or other source of motion data is used to combine range measurements obtained using the event camera/laser system into the range model 126, representing the ground surface. Sources of motion information include accelerometers and sources of odometry data from the vehicles wheels, or any means to determine the relative motion of the sensor between readings. The range model 126 may be sparse (it may contain holes) because, for example, parts of the ground surface illuminated by the laser are not visible to the event camera and/or, for example, parts of the ground surface are unchanging and do not produce change events.

In this way, motion data corresponding to the event camera's observations is used to produce a spatially-organised collection of the range measurements. In a further embodiment motion information may not be available and a range model is constructed where the axis orthogonal to the lines of range measurements being collected represents time (this axis typically represents the direction—but not the magnitude—of motion). Thus, timing data corresponding to the event camera's observations is used to produce a time-organised collection of range measurements. In order to facilitate matching to a collection of later acquired range measurements, the range model may require to be adjusted to a different binning frequency or warped in order to accommodate differences in speed and direction. This operation can be eliminated by applying a spatial mapping to the temporal data.

To reduce the detection of events that are not created at the observed laser stripe the event camera may be fitted with an optical filter tuned to the frequency of the laser light. This filter may also be tuned to the polarisation of the laser light. Events not created at the observed laser stripe may also be filtered out using software running on the processor. For example, the image position of the observed laser stripe may be estimated by histogramming the position of events and then rejecting events that do not contribute to the peak of the histogram. It may be preferable to use a frequency of laser light than does not naturally occur in the environment to further reduce unwanted events.

Figure 1D:
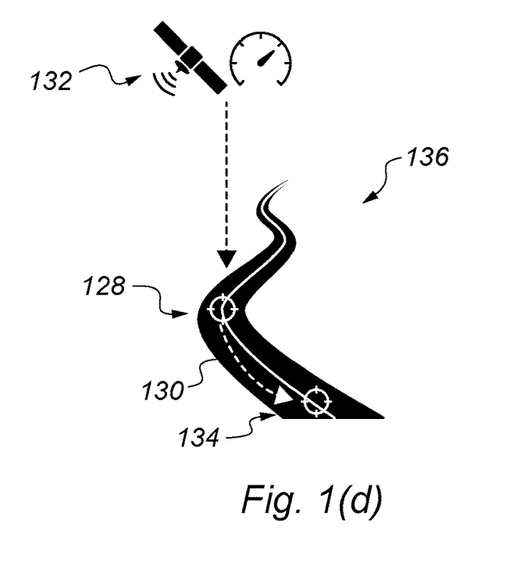

With reference to FIG. 1(d), an initial position 128 on the ground 130 is estimated using GPS and/or odometry data 132. The range measurements determined from change event data resulting from observation of the ground surface are used to determine a refined location 134 by using the range measurements determined from change events as a signature of the ground surface at the location of the vehicle. These range measurements are matched to range measurements previously captured at the same location by searching the range measurements, previously captured and stored in a map 136, in a region close to the initial position 128.

Various methods for matching range measurements may be used. Some methods work directly on range measurements, for example the well-known Iterative Closest Point (ICP) algorithm. Other methods process the range measurements to extract features and matching is performed using these features. A common technique for feature based matching is the RANSAC (Random sample consensus) algorithm and its variants. An initial match based on extracted features may be further refined by applying ICP and the refined match qualified as a good or bad match based on the fit error.

Matching of features and subsequent localisation may be done using Particle Filter Localisation also known as Monte Carlo Localisation. A Particle Filter maintains a set of potential matches between the stored model and newly acquired data. Each particle is evaluated for goodness of fit and a strategy is employed to discard poorly fitting particles and to generate new replacement particles. An advantage of a Particle Filter Localisation is that provides an efficient and effective way to optimise matching by using the results of earlier matches and an estimate of the motion.

In an embodiment where motion information is not available in the construction of a range model, a range model may be stretched or warped relative to another range model representing the same location along the axis in the direction of motion. The matching algorithm is required to determine one (for simple linear stretching) or more (for more complex warping) additional parameters to account for this stretching or warping.

As well as being used for matching, a signature can also be used as an index into an associative array of stored [signature, location data] pairs. Matching uses one-by-one comparisons whereas indexing uses the signature as a key to access a value in an associative array. This may be implemented using hashing. This is dependent on the quantisation of the signature resulting in a consistent and unique hash value, and that the same input data consequently sampled from the same exact physical point will have guaranteed invariance during capture in order to generate this same hash value.

Matching and indexing are both examples of searching.

Figure 2:
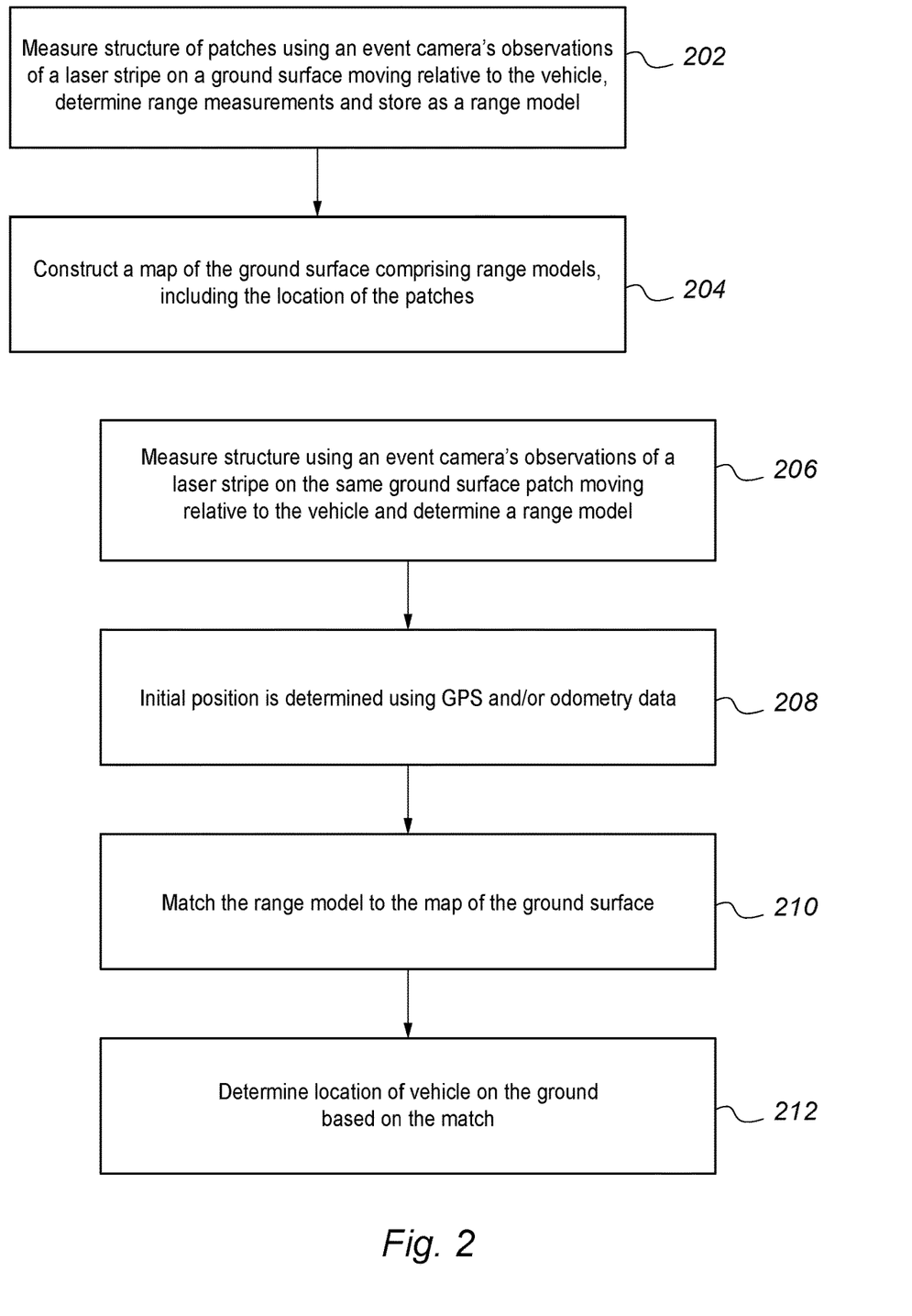
FIG. 2 illustrates, in schematic form, a method for estimating the location of a vehicle using a structured light source in accordance with an embodiment of the present invention.

With reference to FIG. 2, the steps of a method for estimating a location of a vehicle using structured light to recover a range model are:

202: The structure of patches of the ground surface is measured using an event camera (dynamic vision sensor) and structured light, for example a laser plane projected on the ground surface. A sequence of change events arise from the event camera's observations of the laser stripe scattering off the ground surface moving relative to the vehicle. The change events thus are generated in response to motion of the event camera in the vehicle across the ground surface. In the description and claims, arising from should be interpreted to mean as a consequence of. The change events are stored in a memory. As discussed above, the change events are processed to determine range measurements using the known calibrated position of the laser plane relative to the event camera. An accelerometer (and/or other source of motion information) is used to combine range measurements obtained using the event camera/laser system into a collection of range measurements stored as a range model. The purpose of combining motion information is that organises the range model observations spatially, as opposed to temporally, which facilitates invariance to the speed of capture and simplifies matching.

204: Construct a map of the ground surface comprising range models of the ground surface patches including the locations of the patches. A map is a spatial organisation of information within a common coordinate frame and in this example is a collection of signatures annotated with locations.

206: Measure structure of the same patch of ground surface using an event camera (dynamic vision sensor) and structured light, for example a laser plane projected on the ground surface. Thereby a sequence of change events are obtained from the event camera's observations of the same patch of ground surface moving relative to the vehicle. Again, the change events are processed to determine range measurements using the known position of the laser plane relative to the event camera. An accelerometer (and/or other source of motion information) is used to combine the range measurements obtained using the event camera/laser system into a collection of range measurements stored as a range model.

208: Optionally, an initial position is determined using GPS and/or odometry data.

210: Match the range model generated in step 206 to the map of the ground surface constructed in steps 202 and 204. This may use the initial position if available from step 208 to limit the search to range models in the map close to the initial position.

212: Determine location of vehicle on the ground based on the match.

The fine structure of the ground surface is thus used to estimate the location by using the range model, derived from event camera change events, as a signature of the ground surface at the location of the vehicle. This surface moves very quickly at typical vehicle speeds and this problem is addressed by capturing the relative movement of the ground surface structure with an event camera.

An advantage of this embodiment is that because the lighting is controlled, the sequence of change events is consistent for two subsequent traversals over the same surface because the lighting is consistent resulting thus avoiding different shading and shadows. Furthermore, the system works well in the dark.

In a further embodiment the range models may be processed to extract range model features. Features may, for example, be defined at extrema points or points of inflection of the curvature of the range model and the feature may describe the local geometry. Range model features may then be used as a signature of the ground surface at the location of the vehicle.

In another embodiment different light sources may be used. A simple light source is a non-structured, for example uniform, source of light bright enough so that the appearance of the ground surface as observed by the event camera is largely dependent on this light rather than the external light. This can be improved further by (1) selecting the position of the acquisition unit, such as under the vehicle, to reduce external light or (2) using a light source of a certain wavelength and having a filter in front of the event camera to exclude other wavelengths (for example near-infrared).

The height of operation of the event camera may be determined relative to the scale of features present in the ground surface and the optical system used to resolve it.

The optical system of the event camera may be optimized to minimise the effects of radial distortion and other aberrations by calibration. The optical system of the event camera may be kept clean by choice of housing material and mechanical means.

As the vehicle moves, the surface in front of the camera changes and this generates change events in the event camera (as the intensity of any pixel increases or decreases by an amount above a threshold). This sequence of change events is used construct an invariant representation that is used as a signature for the location of the vehicle. The change events are dependent upon both the 3D ground surface structure, since the intensities viewed by the pixels will be dependent upon the structure due to shading and shadows, and dependent upon the ground surface appearance due to its material properties. Because the vehicle approach angle (within lane) is very constrained, the surface is often very similar.

Figure 3A:
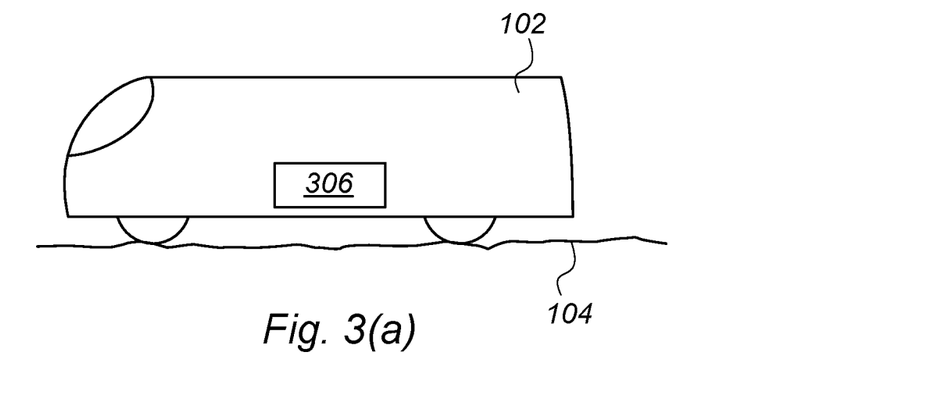
FIG. 3 illustrates, in schematic form, a system for estimating a location of a vehicle using a simple light source in accordance with an embodiment of the present invention.
Figure 3B:
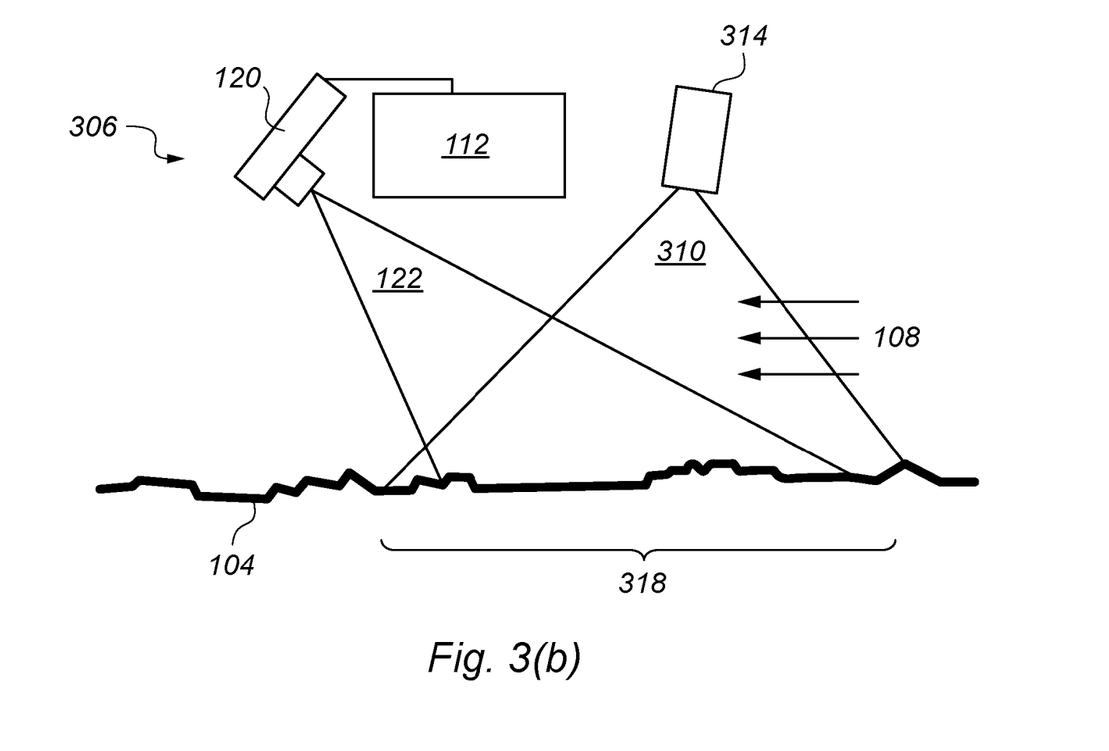

With reference to FIG. 3, a system for estimating a location of a vehicle using a simple light source is illustrated. The system for precisely locating a vehicle is based on capturing the fine structure and appearance of the ground surface, using acquisition as shown in FIG. 3(b). Features in common with those shown in FIG. 1 are given the same reference numerals.

FIG. 3(a) illustrates the vehicle, which in this example is a car or train 102. The vehicle is travelling across a ground surface 104 such as a road or track bed (the rails are not shown). The vehicle has an acquisition unit 306, the operation of which is illustrated by FIG. 3(b).

As illustrated by FIG. 3(b), motion along the surface of the ground 104 at speed 108 is illuminated by a spread-out beam of light 310. A processor 112 activates a simple light source 314. Alternatively, the simple light source could just be 'on' and not necessarily controlled by a processor. The output spread-out beam of light creates an illuminated region 318 on the ground surface where the spread-out beam of light 310 is scattered by the ground surface 104. Change events are generated instantaneously by an event camera 120 in the acquisition unit 306, which has a field of view 122, as observations of the illuminated region 318 pass across event camera pixels due to the motion of the ground surface.

Figure 4:
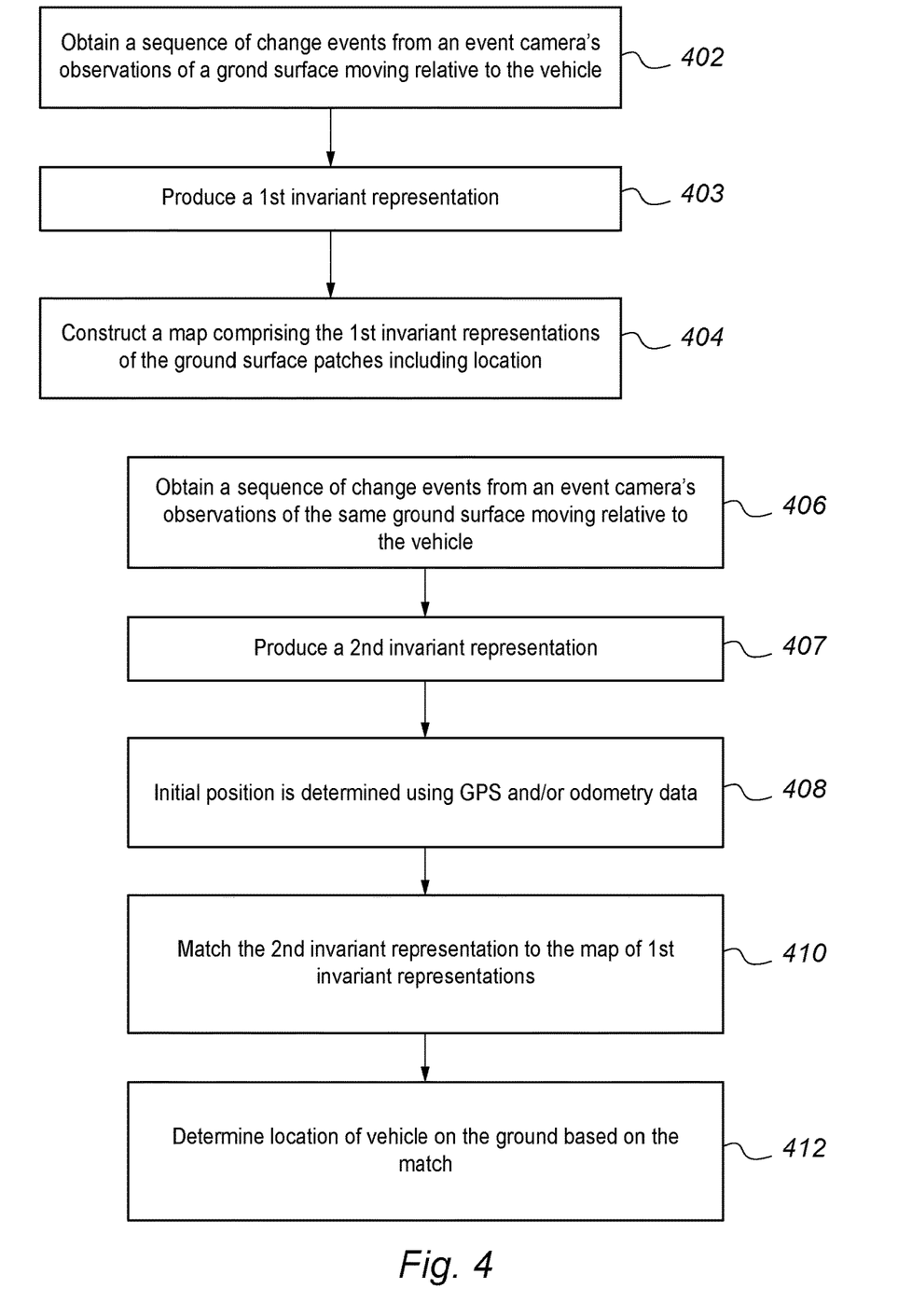
FIG. 4 illustrates, in schematic form, a method for estimating a location of a vehicle using an invariant representation determined from change events in accordance with an embodiment of the present invention.

With reference to FIG. 4, the steps of a method for estimating a location of a vehicle using an invariant representation determined from change events are:

402: A patch of ground surface is observed using an event camera. This generates a sequence of change events arising from the ground surface moving relative to the vehicle.

403: The sequence of change events are processed to produce a 1st invariant representation that is stored in a memory.

404: Construct a map comprising the 1st invariant representations of the ground surface patches including the locations of the patches.

406: Measure the same patch of ground surface thereby obtaining a sequence of change events from an event camera's observations of the same patch of ground surface moving relative to the vehicle.

407: The sequence of change events are processed to produce a 2nd invariant representation.

408: Optionally an initial position is determined using GPS and/or odometry data.

410: Match the 2nd invariant representation determined from change events generated in step 406 to the map of 1st invariant representations determined from the change events in steps 402, 403 and 404. This may use the initial position from step 408 to limit the search for 1st invariant representations in the map close to the initial position.

412: Determine location of vehicle on the ground based on the match.

Again, the fine details of the ground surface are thus used to estimate the location by using the change events as a signature of the ground surface at the location of the vehicle. This surface moves very quickly at typical vehicle speeds and this problem is addressed by capturing the relative movement of the ground surface structure and/or appearance with an event camera.

We now describe the sequence of change event data and how this may be used to create an invariant representation. Each event has a pixel location, a time stamp and polarity (+ if it gets brighter and − if it gets darker for example). Individual "raw" events are unlikely to be useful for matching without some processing since, unless the camera follows exactly the same trajectory under exactly the same lighting and at the same speed, the positions and relative timing of the events will be different. The events are therefore processed to produce an "invariant" representation that is suitable for searching by matching or indexing. Invariant means a representation that has properties that do not change given certain changes in the input, e.g. lighting and speed.

In one embodiment this invariant representation is not explicitly defined and machine learning techniques are used to determine this automatically from examples. Learning may be supervised where features in the event data being used for training are labelled or learning may be unsupervised where the event data being used for training is not labelled. There may also be a control signal—in which case the 3rd form of machine learning (i.e. reinforcement learning) may be used.

In a further embodiment multiple events are explicitly integrated into a larger representation that has invariant properties that can be matched. For example, events may be aggregated over a short period of time to produce features.

In a further embodiment spatio-temporal filters are used that produce a response when a sequence of events with certain space/time properties are observed. The output of these filters is the invariant representation used for searching by matching or indexing.

In a further embodiment the invariant representation is an orthographic map of change events. The ground is assumed to be planar and viewed from a known height with an event camera with known calibration allowing the events to be mapped from perspective coordinates to orthographic coordinates. The motion of the event camera is estimated using optical flow. The motion can be estimated from the change events, the change events arising from the ground surface moving relative to the vehicle.

A suitable example of estimating motion directly from the change events using optical flow is described in "Simultaneous Optical Flow and Intensity Estimation From an Event Camera", Patrick Bardow, Andrew J. Davison, Stefan Leutenegger; The IEEE Conference on Computer Vision and Pattern Recognition (CVPR), 2016, pp. 884-892. Optical flow may be defined as the correspondence field between two temporally close intensity images, for example an estimation of two parameters per pixel, the horizontal and vertical displacement between one frame and the next. Another way of estimating motion from the change events using optical flow is by forming event images by accumulating events over a period of time and using conventional methods for optical flow applied to consecutive event images.

Figure 5:
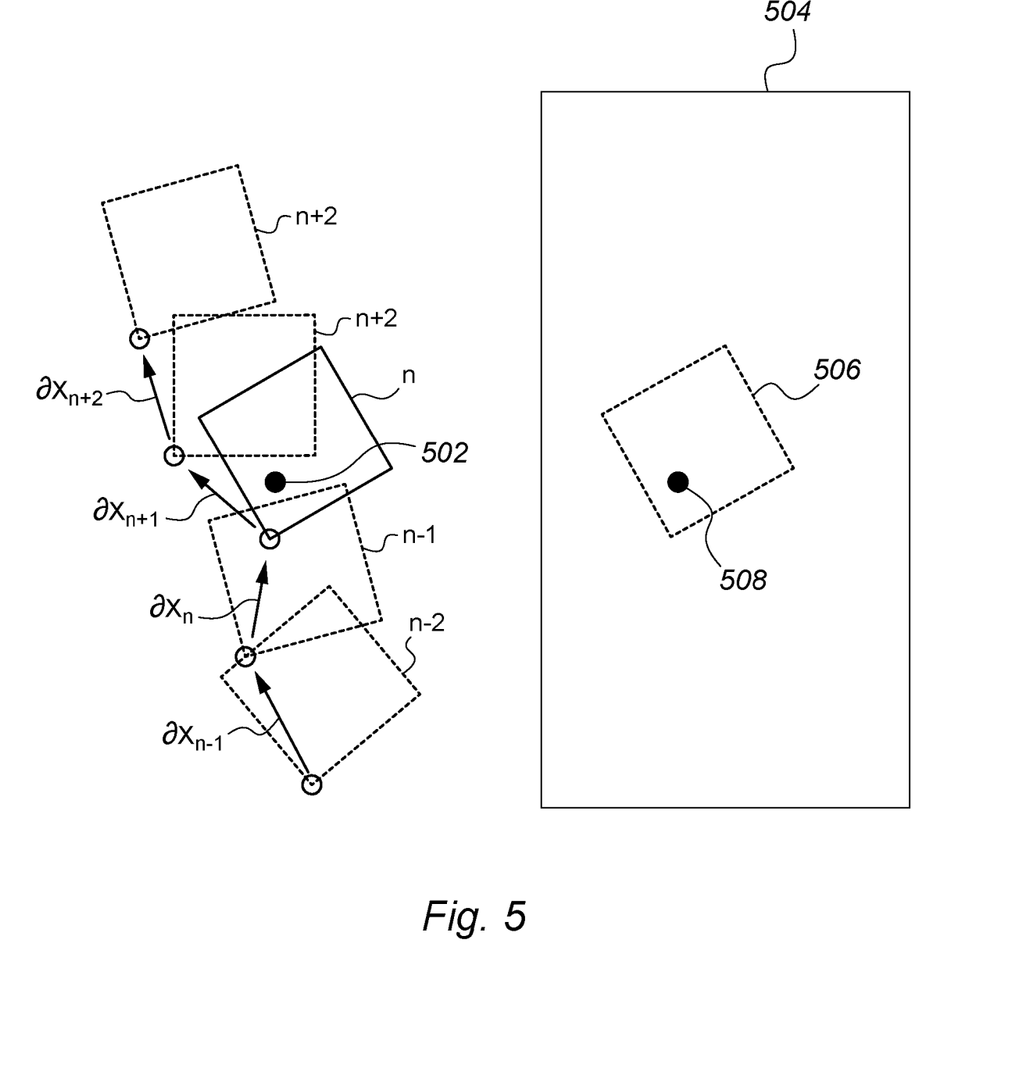
FIG. 5 illustrates, in schematic form, mapping events from local event camera coordinates into orthographic map coordinates using optical flow estimates in accordance with an embodiment of the present invention.

An orthographic map is determined by mapping events from local event camera coordinates into orthographic map coordinates using the optical flow estimates. The values stored in the map are derived from the change events, for example by calculating the mean value of polarity of change events at each point in the orthographic map. The map may be stored as a discrete sparse array. This is illustrated in FIG. 5. It should be noted that each event may occur at a different point in time and existing in its own local event camera coordinate frame.

With reference to FIG. 5, the squares labeled n−2 to n+2 represent the view on the ground of the moving event camera at various points in time in event camera coordinates. Each view has a coordinate frame depicted by a circle and two axes. The optical flow is the sequence of transformations $\partial x_{n-1}$ to $\partial x_{n+2}$ that trace the movement of the coordinate frames. Feature 502 is a change event occurring at time n located within view n. View n is mapped into the orthographic map 504. Feature 508 is the change event 502 mapped into the orthographic map. The dotted square 506 depicts the position of view n relative to the orthographic map 504.

In another embodiment, the ground surface is observed with an event camera, but controlled or powered light is not introduced and the natural environmental lighting is exploited.

Embodiments of the present invention provide a sensor that is significantly cheaper (when manufactured at scale), capable of operating at speed, with robustness to environment lighting, and with lower power and lower processing requirement—for capturing the detailed structure and/or appearance of the underlying ground surface patches. A map comprising only the ground surface below the vehicle (rather than other approaches that capture much more of the environment) may be used to perform accurate localisation. Such a map comprises less data, is applicable in both rural and urban environments and is able to offer an extremely precise location.

There are various advantages. The cost of manufacturing the acquisition unit in volume can be less expensive than LiDAR.

Localisation accuracy is much higher than conventional systems given the scale of surface resolved (improving accuracy from m's or cm's to mm's).

The sensor is much more compact and can be mounted discretely on a vehicle as it only requires a view of the ground surface, not the full environment.

The system will work wherever there is a visible, stable ground surface. Even if the surface is partially occluded this approach can work due to the robustness of the matching/representation in the absence of data. Existing systems rely upon fixed large-scale structures that might not be present out of urban centres. Some embodiments work in the dark because of the active illumination of the ground, for example by a laser plane or spread-out light source.

Known systems require complex 3D maps of the environment that may contain lots of extraneous data (pedestrians, vehicles, vegetation) that needs to be cleaned up or ignored in matching algorithms.

Embodiments use a simple top-down view of the ground surface, which simplifies the capture, storage, and processing required.

Location could be (but is not limited to) a particular place or position. Location data may mean data representing a location within a global coordinate system, for example GPS coordinates. Location data may also mean data representing location within a local or relative coordinate system, for example a road-centric coordinate system where the data directly represents a location on a road or a rail-centric coordinate system where the data directly represents a location on a railway. Location data may also mean data that is stored at a location and accessed at that location and not necessarily a description of that location.

The term signature can mean, but is not limited to, a distinctive pattern, product, or characteristic by which something can be identified.

The term ground surface can mean, but is not limited to, any ground surface along which a vehicle may travel, including for example roads, railway track beds (outside or between the rails), sidewalks, parking lots, the surface of an airport or sea port and the ground in an industrial complex.

Embodiments of the invention may be implemented using a computer program comprising one or more sequences of machine-readable instructions describing methods of estimating a location of a vehicle as described above. This computer program may be executed in a programmable data processing apparatus, for example within a vehicle. There may also be provided a data storage medium (e.g. semiconductor memory, magnetic or optical disk) having such a computer program stored therein.

The invention claimed is:

1. A method for estimating a location of a vehicle, the method comprising:
   (a) obtaining change events from an event camera's observations of a ground surface moving relative to the vehicle, the change events arising from the ground surface moving relative to the vehicle;
   (b) determining a signature of the ground surface from the obtained change events; and
   (c) estimating the location using the signature;
   wherein the ground surface is a railway track bed surface.

2. The method of claim 1, wherein the signature of the ground surface characterizes ground surface texture having a wavelength of 50 mm or less.

3. The method of claim 1, further comprising the step of using motion data corresponding to the event camera's observations to produce a spatially-organized collection of the change events for the use as the signature.

4. The method of claim 1, further comprising the step of using timing data corresponding to the event camera's observations to produce a time-organized collection of the change events for the use as the signature.

5. The method of claim 1, further comprising illuminating the ground surface with structured electromagnetic radiation in the event camera's field of view.

6. The method of claim 1, further comprising the step of determining range measurements representing the ground surface based on the event camera's observations of the ground surface.

7. The method of claim 6, further comprising the step of aggregating the determined range measurements to produce a collection of range measurements representing a patch of the ground surface for the use as the signature.

8. The method of claim 6, further comprising the step of using motion data corresponding to the event camera's observations to combine the determined range measurements into a spatially-organized collection of range measurements representing a patch of the ground surface for the use as the signature.

9. The method of claim 6, further comprising the step of using timing data corresponding to the event camera's observations to combine the determined range measurements into a time-organized collection of range measurements representing a patch of the ground surface for the use as the signature.

10. The method of claim 1, further comprising the step of processing the change events to produce an invariant representation for the use as the signature.

11. The method of claim 10, wherein the step of processing the change events comprises using a spatio-temporal filter to produce a response when a sequence of change events with defined space and time properties are obtained, so as to produce the invariant representation.

12. The method of claim 10, wherein the invariant representation comprises an orthographic map of change events and the step of processing the change events comprises mapping the obtained change events from local event camera coordinates into orthographic map coordinates, so as to produce the orthographic map of change events.

13. The method of claim 12, wherein the mapping of the obtained change events comprises determining estimates of motion of the event camera.

14. The method of claim 13, wherein the estimates are determined using optical flow.

15. The method of claim 1 further comprising the step of positioning the event camera under the vehicle.

16. The method of claim 1 comprising the steps of repeating the observations of the ground surface and estimating the location by searching signatures from previous observations that have associated location information.

17. A system for estimating a location of a vehicle comprising: an event camera; and
a processor configured to:
(a) obtain change events from the event camera's observations of a ground surface moving relative to the vehicle, the change events arising from the ground surface moving relative to the vehicle wherein as the vehicle moves, a view of the ground surface in front of the event camera changes and this generates change events in the event camera as the intensity of any pixel increases or decreases;
(b) determine a signature of the ground surface from the obtained change events;
and
(c) estimate the location using the signature;
wherein the ground surface is a railway track bed surface.

18. A computer program product embodied on a nontransitory computer readable medium comprising one or more sequences of machine-readable instructions for estimating a location of a vehicle, the instructions being adapted to cause one or more processors to perform a method for estimating a location of a vehicle, the method comprising:
(a) obtaining change events from an event camera's observations of a ground surface moving relative to the vehicle, the change events arising from the ground surface moving relative to the vehicle wherein as the vehicle moves, a view of the ground surface in front of the event camera changes and this generates change events in the event camera as the intensity of any pixel increases or decreases;
(b) determining a signature of the ground surface from the obtained change events; and
(c) estimating the location using the signature;
wherein the ground surface is a railway track bed surface.

* * * * *